(12) United States Patent
Huang et al.

(10) Patent No.: US 11,640,696 B2
(45) Date of Patent: May 2, 2023

(54) METHOD, COMPUTER DEVICE, AND STORAGE MEDIUM FOR EXPLORING AND COLLECTING SCENE RECONSTRUCTION DATA

(71) Applicant: SHENZHEN UNIVERSITY, Guangdong (CN)

(72) Inventors: Hui Huang, Shenzhen (CN); Yilin Liu, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 17/481,672

(22) Filed: Sep. 22, 2021

(65) Prior Publication Data
US 2022/0351466 A1    Nov. 3, 2022

(30) Foreign Application Priority Data

Apr. 28, 2021   (CN) .......................... 202110462826.X

(51) Int. Cl.
| | |
|---|---|
| G06T 17/20 | (2006.01) |
| G06T 7/50 | (2017.01) |
| G06V 10/46 | (2022.01) |
| G06V 20/00 | (2022.01) |
| G06F 18/22 | (2023.01) |

(52) U.S. Cl.
CPC .............. *G06T 17/20* (2013.01); *G06F 18/22* (2023.01); *G06T 7/50* (2017.01); *G06V 10/462* (2022.01); *G06V 20/00* (2022.01)

(58) Field of Classification Search
CPC ............ G06T 17/20; G06T 7/50; G06V 20/00
See application file for complete search history.

(56) References Cited

U.S. PATENT DOCUMENTS

2019/0035096 A1* 1/2019 Huang .................... B25J 19/023
2021/0295599 A1* 9/2021 Adkinson ................ G06T 7/50

FOREIGN PATENT DOCUMENTS

| CN | 107610212 A | 1/2018 |
|---|---|---|
| CN | 108701373 A | 10/2018 |
| CN | 110262487 A | 9/2019 |

(Continued)

OTHER PUBLICATIONS

English Translation of CN-111966097-A (Year: 2020).*
Chinese Office Action dated Jun. 11, 2021 issued in corresponding Patent Application No. 202110462826.X (10 pages).

*Primary Examiner* — Sing-Wai Wu
(74) *Attorney, Agent, or Firm* — Polsinelli PC

(57) ABSTRACT

A method, computer device, and storage medium for exploring and collecting scene reconstruction data. The method includes: capturing a scene image; performing real-time environment perception on the scene image to detect object to be reconstructed in the scene image and reconstructing three-dimensional representation data of the object to be reconstructed; determining a reconstruction target in the object to be reconstructed based on the three-dimensional representation data of the object to be reconstructed and a preset distance threshold; generating an exploration path according to a preset exploration path planning algorithm and exploring an area to be reconstructed according to the exploration path; and collecting reconstruction data of the reconstruction target according to the preset exploration path planning algorithm when the reconstruction target is reached.

16 Claims, 6 Drawing Sheets

(56) References Cited

FOREIGN PATENT DOCUMENTS

| CN | 110873565 A |   | 3/2020 |
|----|-------------|---|--------|
| CN | 111966097 A | * | 11/2020 |
| CN | 111966097 A |   | 11/2020 |

* cited by examiner

METHOD, COMPUTER DEVICE, AND STORAGE MEDIUM FOR EXPLORING AND COLLECTING SCENE RECONSTRUCTION DATA

CROSS REFERENCE TO RELATED APPLICATIONS

This application claims priority to Chinese Patent Application No. 202110462826X, filed on Apr. 28, 2021, entitled "METHOD AND APPARATUS FOR COLLECTING SCENE RECONSTRUCTION DATA, COMPUTER DEVICE, AND STORAGE MEDIUM", and the entire content of which is incorporated herein by reference.

TECHNICAL FIELD

The present disclosure relates to a method, computer device, and storage medium for exploring and collecting scene reconstruction data.

BACKGROUND

With the rapid development of drone technology, how to use drone to autonomously and quickly reconstruct large-scale urban scene has become the focus of research.

In order to achieve a good reconstruction result, the drone needs to design the best data collection path to fully observe the building from different angles and collect sufficient reconstruction data, and then achieve full coverage of the scene. However, the current method for collecting reconstruction data mostly rely on an additional flight and reconstruction of drone to obtain the geometric prior information of the scene, which greatly increases the reconstruction period and difficulty. And the methods, such as DJI-Terra, which does not require the geometric prior information of the scene cannot adapt well to different scenes. More importantly, all algorithms calculate paths offline. When the pre-calculated scene information is inaccurate, the quality of the planned path will be reduced accordingly, thereby making the collection time longer, and even causing a safety problem of colliding with the scene.

It can be seen that the present method for collecting scene reconstruction data has a problem of low data collection efficiency.

SUMMARY

In view of this, it is necessary to provide a method, computer device, and storage medium for exploring and collecting scene reconstruction data which can improve the data collection efficiency to address the above technical problem.

A method for collecting scene reconstruction data, including:
  capturing a scene image;
  performing real-time environment perception on the scene image to detect object to be reconstructed in the scene image and reconstructing three-dimensional representation data of the object to be reconstructed;
  determining a reconstruction target in the object to be reconstructed based on the three-dimensional representation data of the object to be reconstructed and a preset distance threshold;
  generating an exploration path according to a preset exploration path planning algorithm and exploring an area to be reconstructed according to the exploration path; and
  collecting reconstruction data of the reconstruction target according to the preset exploration path planning algorithm when the reconstruction target is reached.

In an embodiment, the performing real-time environment perception on the scene image to detect the object to be reconstructed in the scene image and reconstructing three-dimensional representation data of the object to be reconstructed includes:
  performing target detection on the scene image and generating two-dimensional representation data corresponding to the detected object to be reconstructed; and
  mapping the two-dimensional representation data to a preset three-dimensional coordinate system to obtain the three-dimensional representation data of the object to be reconstructed.

In an embodiment, the mapping the two-dimensional representation data to the preset three-dimensional coordinate system to obtain the three-dimensional representation data of the object to be reconstructed includes:
  extracting feature points from the scene image;
  performing image feature matching according to the distance between the feature point of a current frame and the feature point of a previous frame to obtain an image feature matching pair;
  analyzing depth information of the feature points and projecting the two-dimensional representation data to a preset three-dimensional coordinate system to obtain initial three-dimensional representation data; and
  updating the initial three-dimensional representation data to obtain the three-dimensional representation data of the object to be reconstructed according to the image feature matching pair.

In an embodiment, the generating the exploration path according to the preset exploration path planning algorithm and exploring the area to be reconstructed according to the exploration path includes:
  decomposing the area to be reconstructed into a plurality of non-overlapping sub-areas; and
  exploring the plurality of sub-areas according to full coverage path planning algorithm starting from a preset starting point until full coverage exploration of the area to be reconstructed is completed.

In an embodiment, the exploring the plurality of sub-areas according to full coverage path planning algorithm starting from the preset starting point until the full coverage exploration of the area to be reconstructed is completed includes:
  interrupting the exploration and collecting reconstruction data of a new object to be reconstructed according to the preset exploration path planning algorithm when the new object to be reconstructed is found and reached in the area to be reconstructed; and
  returning to the step of exploring the plurality of sub-areas according to the full coverage path planning algorithm until full coverage exploration of the area to be reconstructed is completed.

In an embodiment, the collecting the reconstruction data of the reconstruction target according to the preset exploration path planning algorithm when the reconstruction target is reached includes:
  generating a single reconstruction path surrounding the reconstruction target according to the three-dimensional representation data of the object to be reconstructed and preset reconstruction path parameters when the reconstruction target is reached, and collecting the reconstruction data of the reconstruction target according to the reconstruction path; or generating a curved path surrounding the reconstruction target according to the three-dimensional representation data of the object to be reconstructed and preset reconstruction path parameters when the reconstruction target is reached, and executing pre-defined deformation operation based on the curved path to obtain a corresponding reconstruction path, and collecting the reconstruction data of the reconstruction target according to the reconstruction path.

In an embodiment, after the collecting the reconstruction data of the reconstruction target according to the preset exploration path planning algorithm when the reconstruction target is reached, the method further including:

determining an object to be reconstructed with the closest distance to the reconstruction target as a next reconstruction target based on the three-dimensional representation data of the object to be reconstructed and the preset distance threshold; and returning to the step of generating the exploration path according to the preset exploration path planning algorithm and exploring the area to be reconstructed according to the exploration path until the collection of reconstruction data of all the objects to be reconstructed is completed.

An apparatus for collecting scene reconstruction data, including:

an image acquisition module, configured to capture a scene image;

an environment perception module, configured to perform real-time environment perception on the scene image to detect object to be reconstructed in the scene image and reconstruct three-dimensional representation data of the object to be reconstructed;

a target determination module, configured to determine a reconstruction target in the object to be reconstructed based on the three-dimensional representation data of the object to be reconstructed and a preset distance threshold;

an area exploration module, configured to generate an exploration path according to a preset exploration path planning algorithm and explore an area to be reconstructed according to the exploration path; and data collection module, configured to collect reconstruction data of the reconstruction target according to the preset exploration path planning algorithm when the reconstruction target is reached.

A computer device, comprising a processor and a memory storing a computer program, wherein the processor, when executing the computer program, implements the following steps:

capturing a scene image;

performing real-time environment perception on the scene image to detect object to be reconstructed in the scene image and reconstructing three-dimensional representation data of the object to be reconstructed;

determining a reconstruction target in the object to be reconstructed based on the three-dimensional representation data of the object to be reconstructed and a preset distance threshold;

generating an exploration path according to a preset exploration path planning algorithm and exploring an area to be reconstructed according to the exploration path; and collecting reconstruction data of the reconstruction target according to the preset exploration path planning algorithm when the reconstruction target is reached.

A non-transitory computer-readable storage medium on which a computer program is stored, the computer program is executed by a processor to implements the following steps:

capturing a scene image;

performing real-time environment perception on the scene image to detect object to be reconstructed in the scene image and reconstructing three-dimensional representation data of the object to be reconstructed;

determining a reconstruction target in the object to be reconstructed based on the three-dimensional representation data of the object to be reconstructed and a preset distance threshold;

generating an exploration path according to a preset exploration path planning algorithm and exploring an area to be reconstructed according to the exploration path; and collecting reconstruction data of the reconstruction target according to the preset exploration path planning algorithm when the reconstruction target is reached.

In the above-mentioned method and apparatus, computer device, and non-transitory storage medium for collecting scene reconstruction data detects objects to be reconstructed in the scene and reconstructing a corresponding three-dimensional representation data through the real-time environment perception on the scene image, eliminating the need for input of the scene geometric prior information, so that the reconstruction period is greatly shorten; based on the three-dimensional representation data of the objects to be reconstructed and the preset distance threshold, the reconstruction target is determined, and then combined with the exploration path planning algorithm and the reconstruction path planning algorithm, the exploration with full coverage of areas to be reconstructed is realized while obtaining a safe and efficient collection trajectory of reconstruction data, so that the data collection time is shorten. In summary, the method provided in the present disclosure can effectively improve the efficiency of the reconstruction data collection.

DETAILED DESCRIPTION

In order to make the purpose, technical solution and advantages of the present disclosure clearer, the present disclosure will be described in further detail in conjunction with the accompanying drawings and embodiments. It should be understood that the specific embodiments described herein are only used for explaining the present disclosure, rather than limiting the present disclosure.

Figure 1:
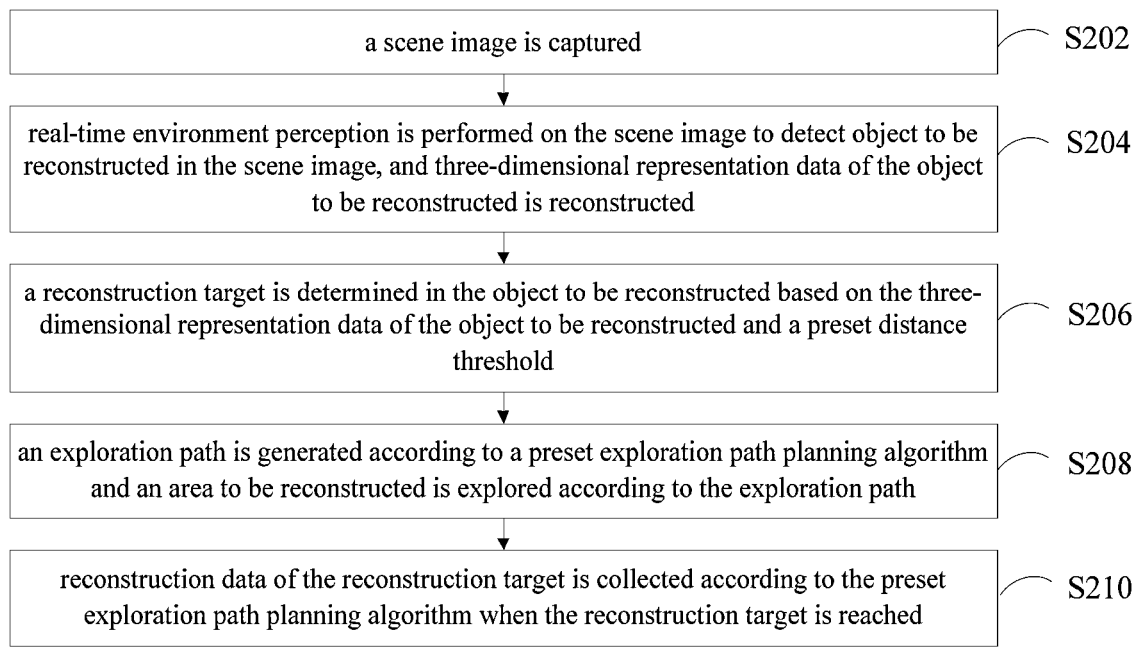
FIG. 1 is a flowchart of a method for collecting scene reconstruction data in an embodiment.

In an embodiment, as shown in FIG. 1, a method for collecting scene reconstruction data is provided. The method applied to a terminal is taken as an example for description in this embodiment. The terminal takes a drone as an example, the purpose of the method is to make the drone fly to a specific perspective and take a two-dimensional picture of the object to be reconstructed, so as to cover the entire scene and realize a complete reconstruction of the scene. It is understood that the method can be applied to a server, and can also applied to a system including a terminal and a server as well, and the method is realized through the interaction between the terminal and the server. In this embodiment, the method includes the following steps:

Step 202, a scene image is captured.

In specific implementation, the drone is equipped with a monocular camera, a sensor, and a processor. The scene image is a two-dimensional image, which can be a scene image of the flight environment taken by the drone during the flight. In the following, the reconstruction data of buildings collected by the drone in large-scale urban scenes, which is used to support the reconstruction of the urban scenes, is taken as an example for description.

Step 204, real-time environment perception is performed on the scene image to detect object to be reconstructed in the scene image, and three-dimensional representation data of the object to be reconstructed is reconstructed.

The environment perception depends on the flight perception technology of drones, which mainly includes measuring physical quantities related to the aircraft motion state. The modules involved include gyroscopes, accelerometers, magnetic compasses, GNSS modules, and optical flow modules, etc. The three-dimensional representation data can be a three-dimensional bounding frame, three-dimensional point cloud data, a three-dimensional network, etc. In this embodiment, the three-dimensional representation data can be a three-dimensional bounding frame. In specific implementation, the real-time environment perception includes three parts: target detection, real-time location and reconstruction, and real-time reconstruction of a three-dimensional bounding frame. Specifically, a building is taken as an example of the object to be reconstructed. After the scene image is captured by the drone, the object detection is performed on the scene image based on the scene image, to locate the building to be reconstructed in the scene image. At the same time, the real-time location and reconstruction is performed on the scene image to obtain a drone pose, an image feature matching pair, and a three-dimensional bounding frame, thereby reconstructing the three-dimensional bounding frame in real-time.

Step 206, a reconstruction target is determined in the object to be reconstructed based on the three-dimensional representation data of the object to be reconstructed and a preset distance threshold.

A certain building is selected as a best viewpoint (i.e. reconstruction target) based on the preliminary observation and the reconstructed three-dimensional bounding frame, combined with the preset distance threshold. In practical application, due to the observed low correlation between the reconstruction possibility and the reconstruction degree and the high cost of the calculation, it can be selected to not to optimize the metric of the reconstruction possibility. On the contrary, the strategy from rough to accurate is used to solve the problem of trajectory designs directly. In other words, the target is not to find the best viewpoint in the entire area to be reconstructed, but to select a best viewpoint in each exploration step. Specifically, considering that the best viewpoint selected based on the shortest distance principle may not be reasonable. Therefore, in this embodiment, the best viewpoint (i.e. reconstruction target) can be selected in the objects to be reconstructed based on the shortest distance principle and the preset distance threshold.

Step 208, an exploration path is generated according to a preset exploration path planning algorithm and an area to be reconstructed is explored according to the exploration path.

In the present disclosure, the drone path planning problem is summarized as an optimization problem. This is, given a three-dimensional scene target S, the goal is to find a flight trajectory V which maximizes the quality of three-dimensional model M(S, V). The model is reconstructed using images captured along route V while minimizing the flight time T(V) required to travel along V. Which is:

$$V = \mathrm{argmax}\ Q(M(S,V)) + \mathrm{argmin}\ T(V)$$

Q(M(S,V)) represents the reconstruction quality evaluation function. The preset exploration path planning algorithm can be designed based on the area decomposition algorithm, and its purpose is to minimize the flight time and save battery. According to the principle of exploring the path as much as possible, the entire reconstruction area is decomposed into multiple areas, that is, a part of the scene is determined as the next reconstruction area to be explored, so that the construction area can be fully explored to achieve full coverage before the drone reaches the reconstruction target. So that the terrain can be reconstructed and all buildings that need additional reconstruction can be detected. After selecting the reconstruction target, two flight paths will be generated accordingly. The first path is called the exploration path, which is used to check the space between the current drone and the reconstruction target to ensure the drone reaches the reconstruction target and fully explore the area between them. The second path is called the reconstruction path, which is observed with different angles and completely covers the reconstruction target, so that the reconstruction target can be reconstructed with high accuracy and completeness. The entire flight path alternates between the exploration path and the reconstruction path until the scene is completely covered and all buildings are observed. In this embodiment, the exploration mode is started after the reconstruction target is determined, and the area to be reconstructed where the reconstruction target is located is explored and covered completely according to the preset exploration path planning algorithm.

Step 210, reconstruction data of the reconstruction target is collected according to the preset exploration path planning algorithm when the reconstruction target is reached.

The preset reconstruction path planning algorithm is a rule-based fast trajectory optimization method. Its main purpose is to quickly simulate a reconstructed trajectory with a high reconstruction degree, to achieve full coverage of the reconstruction target, and to ensure the images collected achieve better reconstruction effect. In specific implementation, when the drone reaches the reconstruction target, it switches to the reconstruction mode and collects the reconstruction data of the reconstruction target according to the reconstruction path planning algorithm, that is, images are taken around the building to be reconstructed. Then according to the preset distance threshold, the object to be reconstructed with the closest distance from the current reconstruction target is selected as the next reconstruction target among the objects to be reconstructed, and the process returns to step 206, and the above exploration and reconstruction steps are repeated until all the buildings to be reconstructed are reconstructed and all the areas to be reconstructed are covered.

The above method for collecting scene reconstruction data detects objects to be reconstructed in the scene and reconstructing a corresponding three-dimensional representation data through the real-time environment perception on the scene image, eliminating the need for input of the scene geometric prior information, so that the reconstruction period is greatly shorten; based on the three-dimensional representation data of the objects to be reconstructed and the preset distance threshold, the reconstruction target is determined, and then combined with the exploration path planning algorithm and the reconstruction path planning algorithm, the exploration with full coverage of areas to be reconstructed is realized while obtaining a safe and efficient collection trajectory of reconstruction data, so that the data collection time is shorten. In summary, the method provided in the present disclosure can effectively improve the efficiency of the reconstruction data collection.

Figure 2:
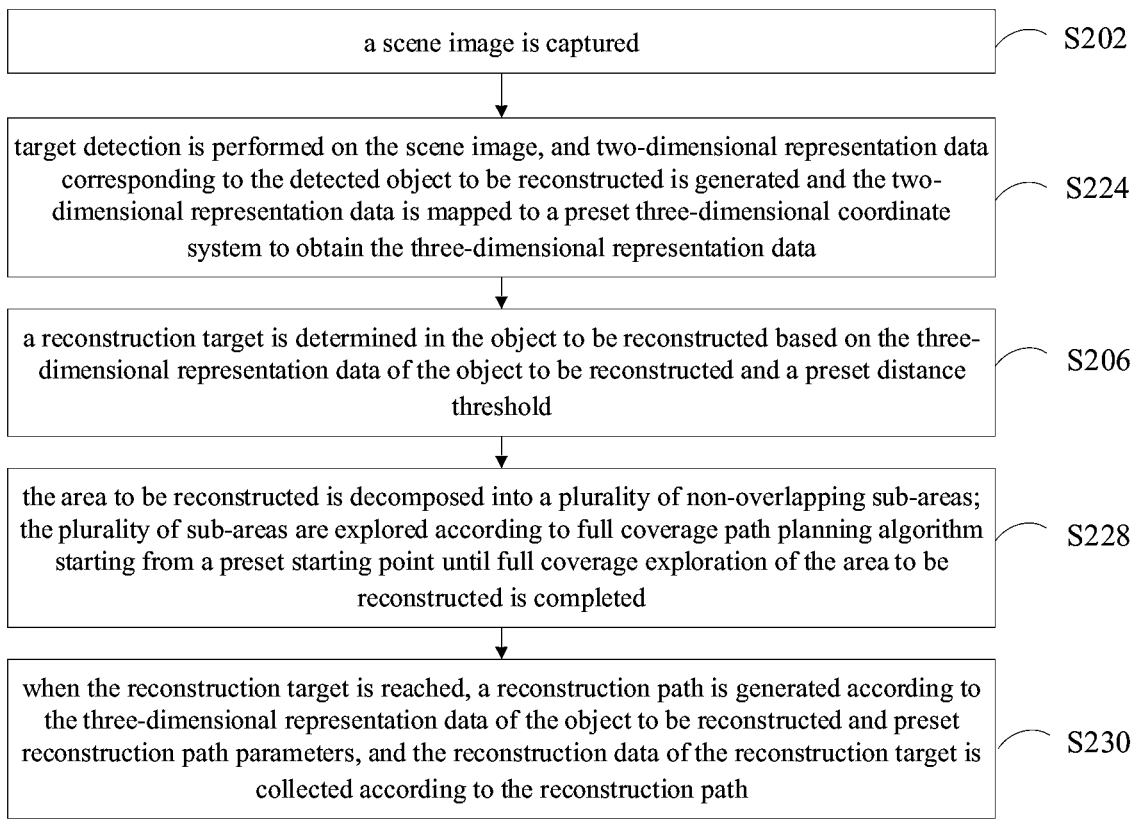
FIG. 2 is a flowchart of a method for collecting scene reconstruction data in another embodiment.

In an embodiment, as shown in FIG. 2, the performing real-time environment perception on the scene image to detect the objects to be reconstructed in the scene image and reconstructing three-dimensional representation data of the objects to be reconstructed includes: step 224, target detection is performed on the scene image, and two-dimensional representation data corresponding to the detected object to be reconstructed is generated and the two-dimensional representation data is mapped to a preset three-dimensional coordinate system to obtain the three-dimensional representation data of the object to be reconstructed.

In this embodiment, the two-dimensional representation data refers to a two-dimensional bounding frame (i.e. two-dimensional rectangular area). It is understandable that in other embodiments, the two-dimensional representation data can be a two-dimensional network, etc. In actual experiments, a new data set was developed which includes virtual or real scenes and corresponding building location information. YOLOv3 is used as a target detection module because it has a fast processing speed and good detection accuracy. In specific implementation, YOLOv3 is applied to all captured scene images to generate a set of rectangular two-dimensional bounding frames for the detected buildings to be reconstructed in real-time. Then, the generated two-dimensional bounding frames are mapped to the preset three-dimensional coordinate system to obtain the three-dimensional representation data of the object to be reconstructed. Although these three-dimensional bounding frames do not provide geometric details, real-time extraction of them already provides enough information to design a safe and effective flight path. In this embodiment, the three-dimensional bounding frames are used as a rough three-dimensional representation of the buildings in the scene, so that it can be calculated in real-time and updated iteratively. The geometric information of the code is also sufficient to create a well-structured reconstruction flight trajectory, thereby reconstructing a good-quality three-dimensional model.

Figure 3:
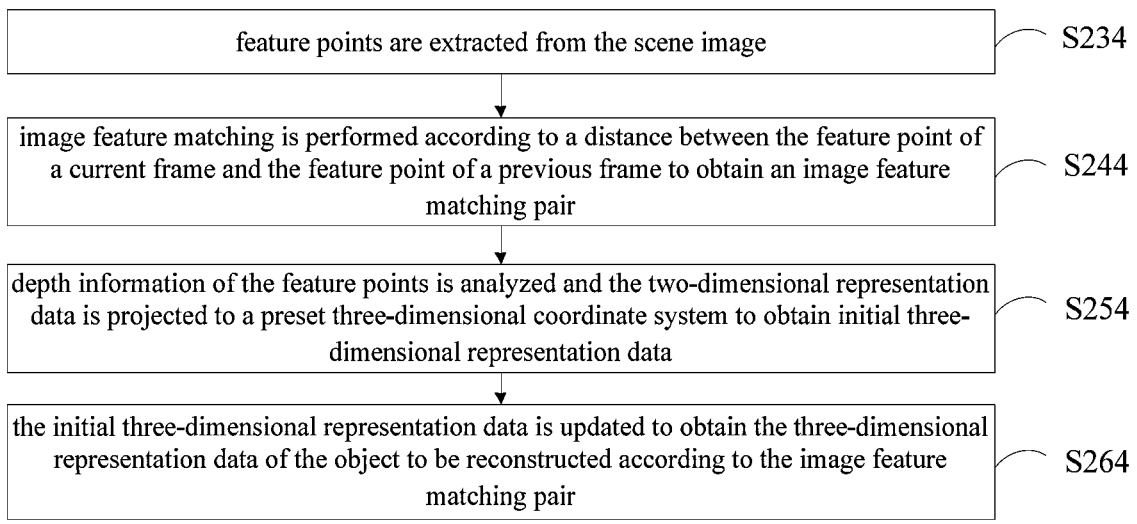
FIG. 3 is a flowchart of steps of obtaining three-dimensional representation data in an embodiment.

In an embodiment, as shown in FIG. 3, the mapping the two-dimensional representation data to a preset three-dimensional coordinate system to obtain the three-dimensional representation data of the object to be reconstructed includes:

Step 234, feature points are extracted from the scene image;

Step 244, image feature matching is performed according to a distance between the feature point of a current frame and the feature point of a previous frame to obtain an image feature matching pair;

Step 254, depth information of the feature points is analyzed and the two-dimensional representation data is projected to a preset three-dimensional coordinate system to obtain initial three-dimensional representation data;

Step 264, the initial three-dimensional representation data is updated to obtain the three-dimensional representation data of the object to be reconstructed according to the image feature matching pair.

Specifically, to map the detected two-dimensional bounding frame to the three-dimensional coordinate system, firstly the SLAM (simultaneous localization and mapping) algorithm is run to extract the three-dimensional position of different feature points in the scene image. Then the image feature matching is performed according to the distance between the feature point of the current frame and the feature point of the previous frame to obtain the image feature matching pair. Then by analyzing the depth range of the feature points extracted, the two-dimensional rectangular area detected for each building is projected onto the preset three-dimensional coordinate system to form the three-dimensional bounding frame aligned with the world coordinate axis. Since the three-dimensional point cloud generated by the SLAM is very sparse, the three-dimensional bounding frame generated may not be accurate or not be able to completely surround the building, especially when the side of the building has not been observed by the drone. In order to solve this problem, the building will be tracked during the entire flight, and the position and the size of the three-dimensional bounding frame in the world coordinates are gradually updated according to the image feature matching pair of the current frame and the image feature matching pair of the previous frame constantly. When the drone observes the building from more angles, the bounding frame becomes more and more accurate.

As shown in FIG. 2, in an embodiment, the generating the exploration path according to the preset exploration path planning algorithm and exploring the area to be reconstructed according to the exploration path includes: step 228, the area to be reconstructed is decomposed into a plurality of non-overlapping sub-areas; the plurality of sub-areas are explored according to full coverage path planning algorithm starting from a preset starting point until full coverage exploration of the area to be reconstructed is completed.

Figure 4:
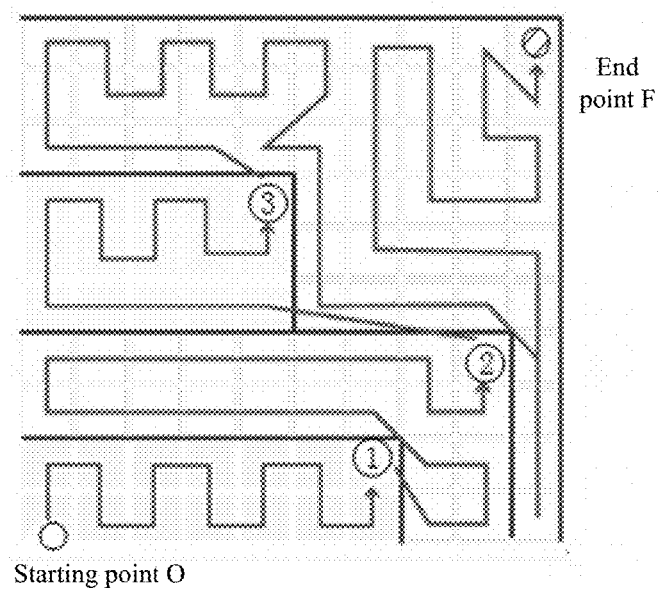
FIG. 4 is a schematic diagram of a principle of exploring and covering an area to be reconstructed according to an exploration path planning algorithm in an embodiment.

When flying in an unknown environment, the drone must explore the entire area and determine all the buildings that need to be reconstructed. In order to ensure that no area is missed, this embodiment uses a two-dimensional grid to subdivide the reconstruction area. The size of the grid unit depends on the visual scope of the drone camera. Initially, all cells are marked as unvisited. The overall goal of the exploration is to observe all cells so that the terrain can be reconstructed and all buildings that need additional reconstruction can be detected. In order to follow the principle that the flight time is the shortest and the path used for exploration should be as short as possible, the exploration path planning algorithm is designed based on the area decomposition in this embodiment. Specifically, the area to be reconstructed is decomposed into non-overlapping polygons to obtain multiple non-overlapping sub-areas. Every time the drone needs to go the building $B_j$ centered on X for reconstruction, a rectangle is generated using the entire scene and a pre-defined starting point O of position X. All the covered areas are subtracted from the rectangle to from the sub-area before reconstructing the building $B_i$. Therefore, the problem becomes a full coverage path planning problem with specific start and end positions, the full coverage path planning algorithm based on path conversion can be used to solve this problem. In practical application, as shown in FIG. 4, the starting point O is set as a corner of the area to be reconstructed which is the position closest to the take-off point of the drone. Therefore, the sub-area to be covered is generally L shape. Starting from the preset starting point O, multiple sub-areas are explored according to the full coverage path planning algorithm. If there is no any known building such as $B_i$ existed in a certain sub-area, the area would continue to increase with a default size. In this embodiment, the above strategy is adopted to ensure that every time the exploration of a given area to be reconstructed is completed, all cells in the area will be visited, thus eliminating the need to fly back to the area, shortening the exploration period and saving battery.

In an embodiment, the exploring the plurality of sub-areas according to full coverage path planning algorithm starting from the preset starting point includes: when the new object to be reconstructed is found and reached in the area to be reconstructed, the exploration is interrupted and reconstruction data of a new object to be reconstructed is collected according to the preset exploration path planning algorithm; returns to the step of exploring the plurality of sub-areas according to the full coverage path planning algorithm until full coverage exploration of the area to be reconstructed is completed.

In practical application, the new object to be reconstructed may be found during the exploration step. How to deal with the new object to be reconstructed depends on the position thereof. Building is taken as an example. For a new building in the exploration area, when the drone reaches the cell where the building is located, the exploration is interrupted and reconstruction data is collected for this building. Then the exploration is resumed and continues the step of exploring the plurality of sub-areas. The buildings detected outside the area are simply added to all other detected buildings. When the reconstruction target is reached, all the buildings in the area to be reconstructed where the reconstruction target is located can be fully observed and all the buildings need to be reconstructed can be determined by adopting above manner.

As shown in FIG. 2, in an embodiment, the step of collecting reconstruction data of the reconstruction target according to the preset exploration path planning algorithm when the reconstruction target is reached includes: step 230, when the reconstruction target is reached, a reconstruction path is generated according to the three-dimensional representation data of the object to be reconstructed and preset reconstruction path parameters, and the reconstruction data of the reconstruction target is collected according to the reconstruction path.

The calculation cost of the reconstruction degree defined by the existing method is very expensive, and it is not closely related to the reconstruction quality. Therefore, a set of simple rules are adopted to design reconstruction path planning algorithm for real-time reconstruction. The preset reconstruction path parameters include camera tilt angle, distance and camera heading, etc. For every building, a curved trajectory surrounding $B_i$ is generated according to the three-dimensional bounding frame extracted mentioned above and the reconstruction path parameters. The curved trajectory can be spiral. Specifically, the design of the reconstruction path is first initialized to the surrounding trajectory around the building $B_i$, and the distance to the surface of the building is fixed (the default is 35 m). By default, the tilt angle of the camera is fixed at 30 degrees and the heading of the camera is set to face the center of the loop. In this embodiment, reconstruction path is generated according to the reconstruction path parameters and the three-dimensional bounding frame, which can ensure the viewpoints are uniformly sampled on the spiral to ensure the smoothness and the efficiency of the total trajectory.

In an embodiment, the collecting the reconstruction data of the reconstruction target according to the preset exploration path planning algorithm when the reconstruction target is reached includes: when the reconstruction target is reached, a single reconstruction path surrounding the reconstruction target is generated according to the three-dimensional representation data of the object to be reconstructed and preset reconstruction path parameters, and the reconstruction data of the reconstruction target is collected according to the reconstruction path; or when the reconstruction target is reached, a curved path surrounding the reconstruction target is generated according to the three-dimensional representation data of the object to be reconstructed and the preset reconstruction path parameters, and a pre-defined deformation operation based on the curved path is executed to obtain a corresponding reconstruction path, and the reconstruction data of the reconstruction target is collected according to the reconstruction path.

Figure 5:
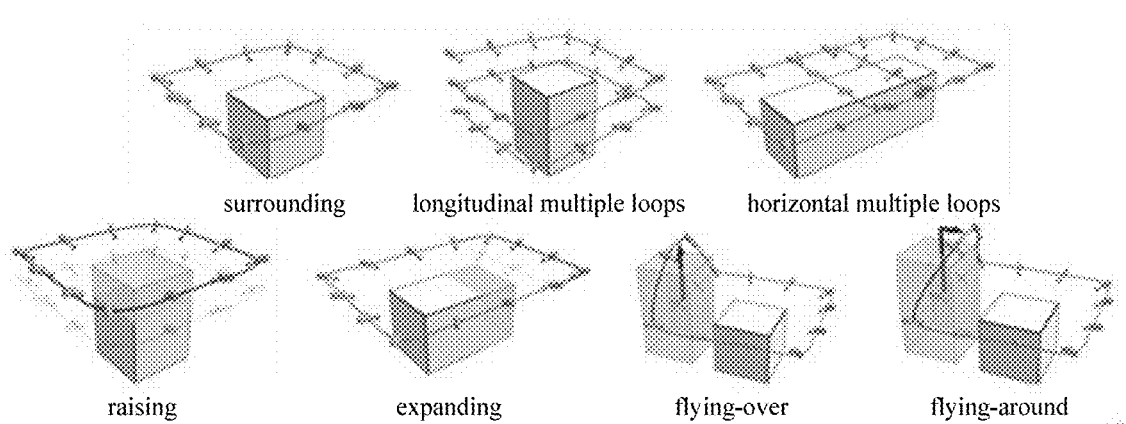
FIG. 5 is a schematic diagram of an effect of deforming a reconstructed path in an embodiment.

Since the initial spiral line cannot adapt to the diverse shapes of the building $B_i$, for example, a single circular trajectory may not be suitable for high-rise or large building, and may also collide with the neighboring buildings of $B_i$, the trajectory can be further deformed through the pre-defined deformation operations. Specifically, the deformation operations can include longitudinal multiple loops, horizontal multiple loops, raising, expanding, flying-over, and flying-around operations, etc. The specific deformation effect can be seen in FIG. 5. The foundation of the reconstruction path of each building $B_i$, is generated surrounding the spiral trajectory of $B_i$. This embodiment provides two variants of the circular trajectory. Here, the horizontal and vertical degree is also needed to be set for the reconstruction path parameters to ensure that the overlap of the viewing field between the loops reaches 50% or more.

If $B_i$, is high enough and the camera s vertical viewing field is not enough to cover its sides, an additional circular trajectory is to ensure full coverage and ensure 50% viewing field overlap between the loops. Furthermore, multiple loops can also be combined into spiral-shaped longitudinal multiple loops, and the height can be continuously reduced to obtain a smooth flight path. Similarly, if the coverage area is too large, due to the lack of strong correspondence between the views, reconstructing $B_i$ using viewpoints from a single loop trajectory may cause the model to be deformed. Therefore, $B_i$, can be divided into multiple parts, and a loop is generated for each part. The resulting trajectory is called horizontal multiple loops, which helps to ensure a better reconstruction of both sides and top of $B_i$.

Since the bounding frame of the building can be detected in real-time, the drone will observe $B_i$ from different angles. The estimated bounding frame of $B_i$ may be higher or larger, so the loop trajectory can be raised to a higher height or enlarged to cover the expanded bounding frame to accommodate this change.

The trajectory obtained through above operations can ensure the vertical and horizontal coverage of target building $B_i$, and adapt to the three-dimensional bounding frame of $B_i$. However, the trajectory obtained may collide with the neighboring buildings. Here, a height graph of the environment can be used to detect potential collision. Once a given viewpoint is found located in an unsafe area of another building, flying-over or flying-around of the surrounding trajectory will be tried to ensure that all viewpoints are located in safe area. Flying-over is to raise all viewpoints above the obstacles to ensure flight safety. If an obstacle at the position of the new viewpoint obstructs the building $B_i$, flying-around is further applied to move the viewpoint closer to $B_i$ to improve visibility. During the entire planning process, if the viewpoints that are too close to the viewpoints that have been used are detected, these redundant viewpoints are deleted to maintain safe, short and effective building reconstruction trajectory.

Figure 6A:
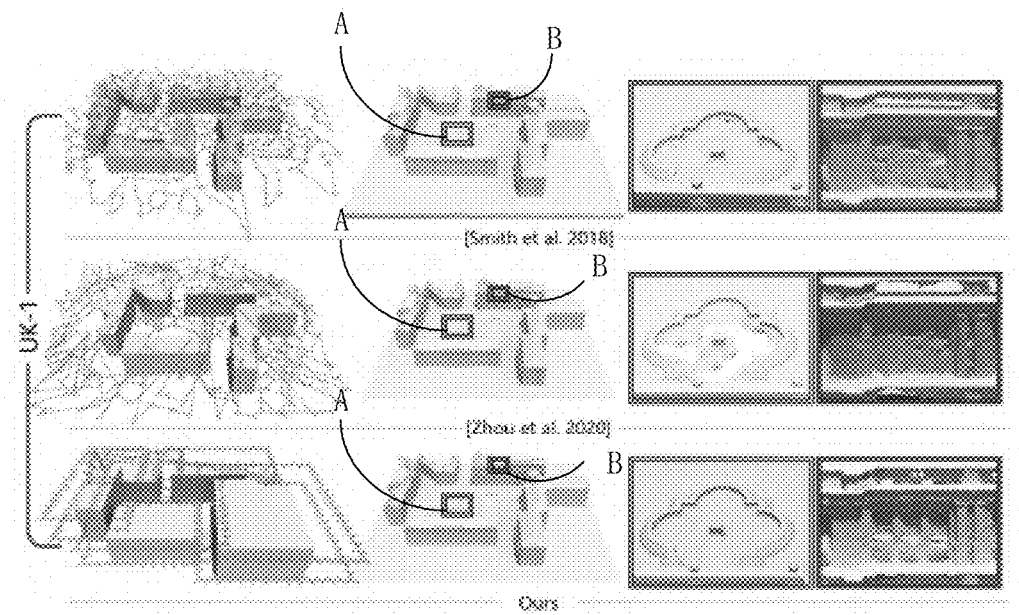
FIG. 6(a) is a schematic diagram of an effect of comparing the scene reconstruction result of the present disclosure and the existing method for scene M in an embodiment.
Figure 6B:
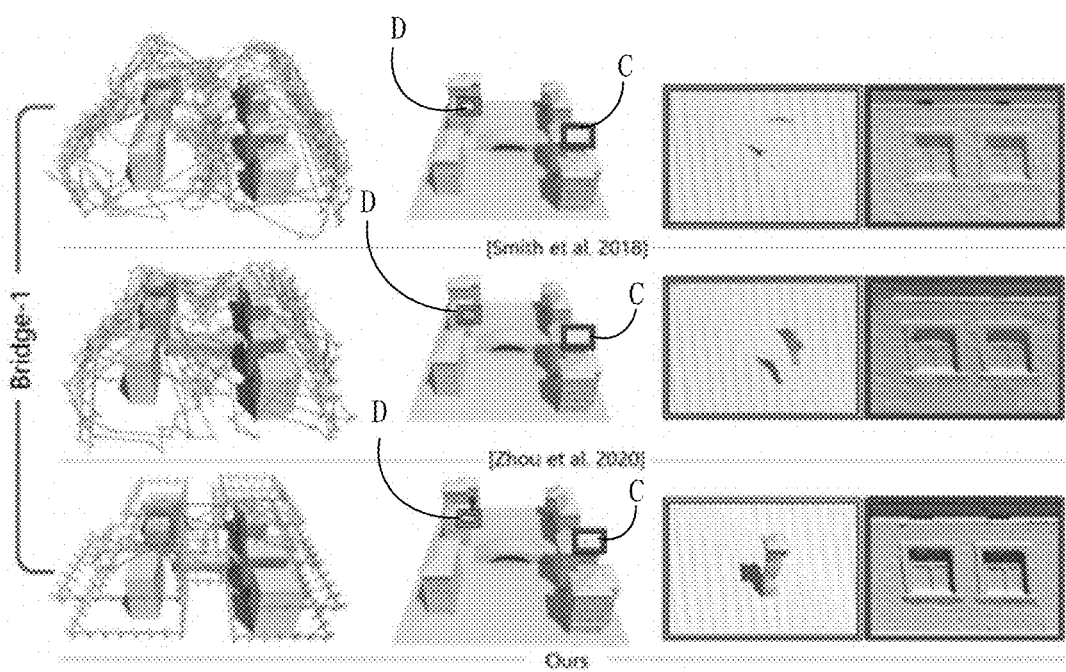
FIG. 6(b) is a schematic diagram of the effect of comparing the scene reconstruction result of the present disclosure and the existing method for scene N in an embodiment.

The method for collecting scene reconstruction data provided in this disclosure has been experimented in multiple scenes, as shown in FIG. 6(a) and FIG. 6(b). FIG. 6(a) and FIG. 6(b) is a comparison diagram of the reconstruction results of the drone between the present disclosure and the existing method for scene M and scene N respectively. The first and second row of FIG. 6(a) respectively show the reconstruction results of existing method for scene M, and the third row of FIG. 6(a) shows the reconstruction result of the present disclosure for scene M. The first column of FIG. 6(a): a comparison diagram of the path planned by the existing method and the present disclosure; the second column of FIG. 6(a): a comparison diagram of reconstruction result of the existing method and the present disclosure for scene M; the third column of FIG. 6(a): a comparative enlarged view of detail A in the second column; the fourth column of FIG. 6(a): a comparative enlarged view of detail B in the second column.

The first and second row of FIG. 6(b) respectively show the reconstruction result of existing method for scene N, and the third row of FIG. 6(b) shows the reconstruction result of the present disclosure for scene N. The first column of FIG. 6(b): a comparison diagram of the path planned by the existing method and the present disclosure; the second column of FIG. 6(a): a comparison diagram of reconstruction result of the existing method and the present disclosure for scene N; the third column of FIG. 6(b): a comparative enlarged view of detail C in the second column; the fourth column of FIG. 6(b): a comparative enlarged view of detail D in the second column.

Figure 7:
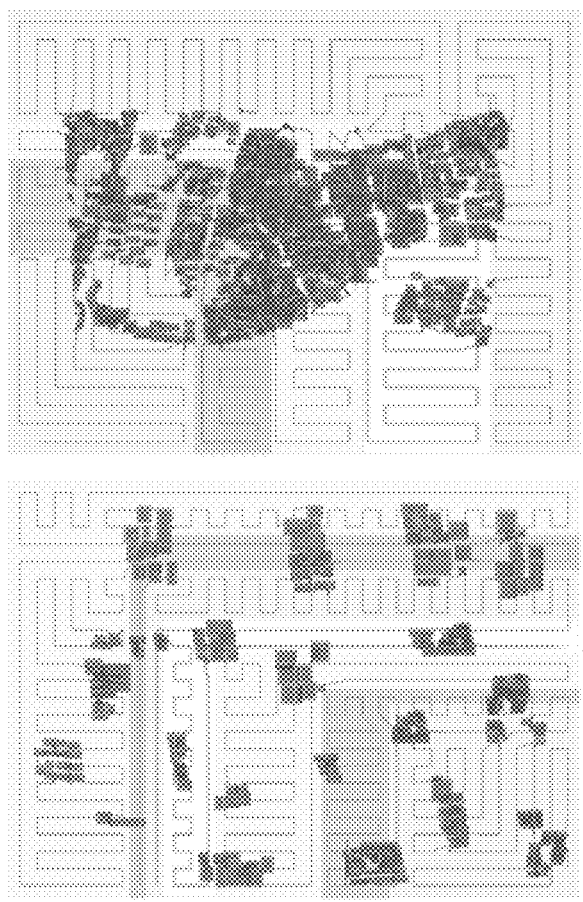
FIG. 7 is a schematic diagram of path planning results in two different urban scenes in an embodiment.

It can be seen from FIG. 6(a) and FIG. 6(b) that the entire scene can be stably reconstructed in each scene on the basis of using less resource and algorithm time in the present disclosure. Furthermore, while ensuring that the entire area to be reconstructed is covered, it can ensure that there is no repeated path locally, which greatly reduces the power consumption of the drone and improves the efficiency of data collection thereof Meanwhile, the exploration path can be planned in real-time while reconstructing the target. Therefore, the method for collecting scene reconstruction data provided in this disclosure has been tested for path planning on multiple scenes. As shown in FIG. 7, two rows of images respectively show path planning result of the present disclosure in two different urban scenes. It can be seen from the image that in this disclosure, while ensuring that the entire area to be reconstructed is covered, it can ensure that there is no repeated path locally, which greatly reduces the power consumption of the drone and improves the efficiency of data collection thereof.

In addition, the method for collecting scene reconstruction data provided in this disclosure has also been tested for an urban three-dimensional scene reconstruction task on the accuracy-completeness index. The accuracy-completeness is a common index of urban three-dimensional scene reconstruction, which can measure the accuracy of reconstruction of unknown scenes. After experiments, in three test scenes with obvious differences in scales and architectural styles, 90% of the three-dimensional model reconstructed by this method have reach an error rate under 0.029 m, 0.028 m, 0.013 m, and the time consumed is about 0.002 s. At the same time, the effectiveness of the path exploration algorithm are compared between two urban scenes with larger scale by this method, and better results than baseline algorithm are achieved in both urban scenes.

It should be understood that although the steps in the flowcharts are displayed in order according to the arrows, the steps are not definitely executed in the order indicated by the arrows. Unless clearly stated in this article, the execution of these steps is not strictly limited in order, and these steps can be executed in other orders. Moreover, at least some of the steps in the flowcharts may include multiple sub-steps or multiple stages. These sub-steps or stages are not definitely executed at the same time, but may be performed at different time, the execution order of these sub-steps or stages is not definitely sequential, but may be executed in turns or alternately with at least a part of other steps or sub-steps or stages of other steps.

Figure 8:
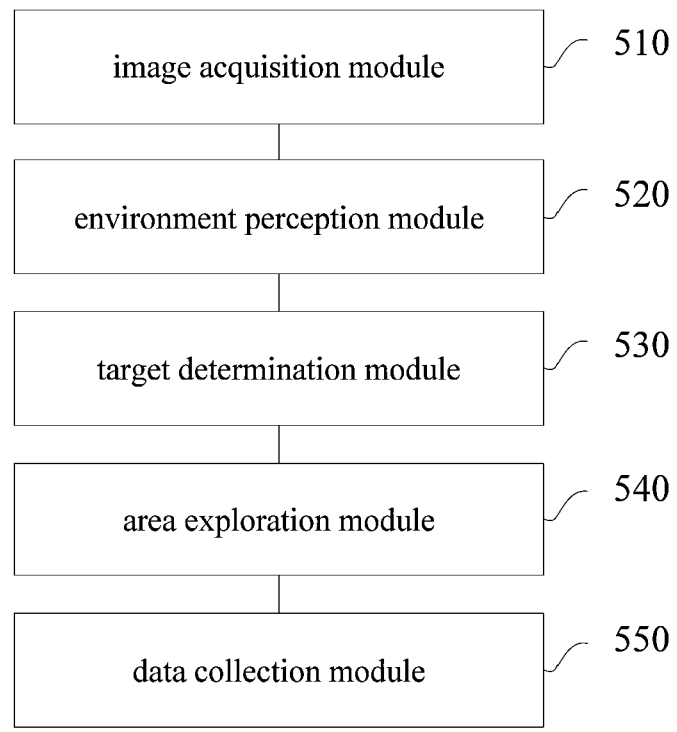
FIG. 8 is a structure block diagram of an apparatus for collecting scene reconstruction data in an embodiment.

In an embodiment, as shown in FIG. 8, an apparatus for collecting scene reconstruction data is provided, including: an image acquisition module 510, an environment perception module 520, a target determination module 530, an area exploration module 540, and a data collection module 550, wherein:

The image acquisition module 510 is configured to capture a scene image;

The environment perception module 520 is configured to perform real-time environment perception on the scene image to detect object to be reconstructed in the scene image and reconstruct three-dimensional representation data of the object to be reconstructed;

The target determination module 530 is configured to determine a reconstruction target in the object to be reconstructed based on the three-dimensional representation data of the object to be reconstructed and a preset distance threshold;

The area exploration module 540 is configured to generate an exploration path according to a preset exploration path planning algorithm and explore an area to be reconstructed according to the exploration path; and The data collection module 550 is configured to collect reconstruction data of the reconstruction target according to the preset exploration path planning algorithm when the reconstruction target is reached.

In an embodiment, the environment perception module 520 is further configured to perform target detection on the scene image and generate two-dimensional representation data corresponding to the detected object to be reconstructed, and map the two-dimensional representation data to a preset three-dimensional coordinate system to obtain the three-dimensional representation data.

In an embodiment, the environment perception module 520 is further configured to extract feature points from the scene image; perform image feature matching according to the distance between the feature point of a current frame and the feature point of a previous frame to obtain an image feature matching pair; analyze depth information of the feature points and project the two-dimensional representation data to a preset three-dimensional coordinate system to obtain initial three-dimensional representation data; update the initial three-dimensional representation data to obtain the three-dimensional representation data of the object to be reconstructed according to the image feature matching pair.

In an embodiment, the area exploration module 540 is further configured to decompose the area to be reconstructed into a plurality of non-overlapping sub-areas; explore the plurality of sub-areas according to full coverage path planning algorithm starting from a preset starting point until full coverage exploration of the area to be reconstructed is completed.

In an embodiment, the area exploration module 540 is further configured to interrupt the exploration and collect reconstruction data of a new object to be reconstructed according to the preset exploration path planning algorithm when the new object to be reconstructed is found and reached in the area to be reconstructed; resume the exploration and execute the operation of exploring the plurality of sub-areas according to full coverage path planning algorithm.

In an embodiment, the data collection module 550 is further configured to generate a reconstruction path according to the three-dimensional representation data of the object to be reconstructed and preset reconstruction path parameters when the reconstruction target is reached, and collect the reconstruction data of the reconstruction target according to the reconstruction path.

In an embodiment, the data collection module 550 is further configured to generate a single reconstruction path surrounding the reconstruction target according to the three-dimensional representation data of the object to be reconstructed and preset reconstruction path parameters; or, generate a curved path surrounding the reconstruction target according to the three-dimensional representation data of the object to be reconstructed and preset reconstruction path parameters, and execute pre-defined deformation operation based on the curved path to obtain a corresponding reconstruction path.

For specific embodiments of the apparatus for collecting scene reconstruction data can refer to the above embodiments of the method for collecting scene reconstruction data, which will not be repeated herein again. Each module in the above apparatus for collecting scene reconstruction data may be implemented in whole or in part by software, hardware, or a combination thereof. The above modules may be embedded in the hardware or independent of the processor in a computer device, or may be stored in a memory in the computer device in the form of software, so that the processor can call and execute the operations corresponding to the above modules.

Figure 9:
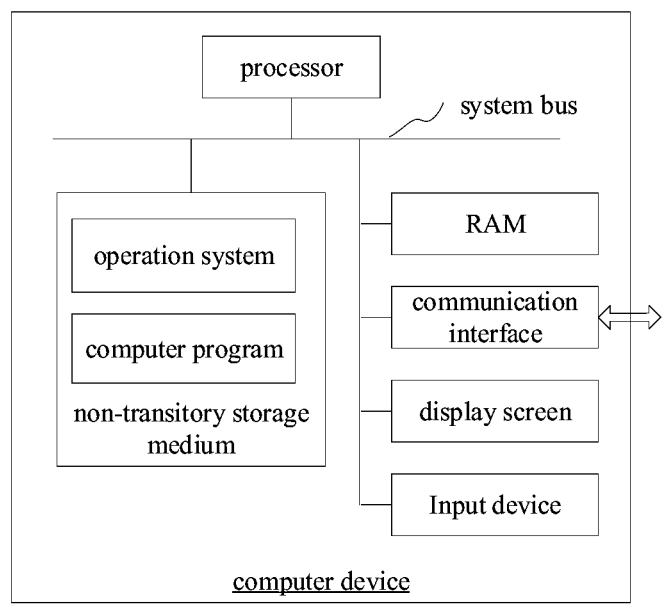
FIG. 9 is an internal structure diagram of a computer device in an embodiment.

In an embodiment, a computer device is provided. The computer device can be a terminal, and internal structure diagram thereof may be as shown in FIG. 9. The computer device includes a processor, a memory, a communication interface, a display screen and an input device connected through a system bus. The processor of the computer device is used to provide calculation and control capabilities. The memory of the computer device includes a non-transitory storage medium and an Random Access Memory (RAM). The non-transitory storage medium stores an operating system and a computer program. The RAM provides an environment for the operation of the operating system and computer programs in the non-transitory storage medium. The communication interface of the computer device is used for wired or wireless communication with an external terminal. The wireless method can be implemented through WIFI, operator network, NFC (Near Field Communication) or other technologies. The computer program is executed by the processor to implement a method for collecting scene reconstruction data. The display screen of the computer device can be a liquid crystal display screen or an electronic ink display screen, and the input device of the computer device can be a touch layer covered on the display screen, or it can be a button, trackball or touchpad set on the computer device shell. It can also be an external keyboard, touchpad, or mouse.

Those of ordinary skill in the art may understand that the structure shown in FIG. 9 in only a block diagram of a part of the structure related to the solution of the present disclosure, and does not constitute a limitation on the computer device to which the solution of the present disclosure is applied. The specific computer device may include more or less parts shown in the figure, or combine other parts, or have a different arrangement of parts.

In an embodiment, a computer device is provided, including a processor and a memory storing a computer program, when the computer program is executed, the processor implements the steps of the above method for collecting scene reconstruction data.

In an embodiment, a computer-readable storage medium is provided, which stores a computer program. The computer program is executed by a processor to implements the steps of the above method for collecting scene reconstruction data.

Those of ordinary skill in the art may understand that all or part of the processes in the method of the above embodiments may be completed by instructing relevant hardware through a computer program, and the computer program may be stored in a non-transitory computer readable storage medium, when the computer program is executed, the process of the foregoing method embodiments may be included. Any reference to the memory, storage, database or other media used in the embodiments provided in this disclosure may include non-transitory and/or transitory memory. Non-transitory memory may include read-only memory (ROM), programmable ROM (PROM), electrically programmable ROM (EPROM), electrically erasable programmable ROM (EEPROM), or flash memory. Transitory memory can include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain (Synch link) DRAM (SLDRAM), memory bus (Rambus) direct RAM (RDRAM), direct memory bus dynamic RAM (DRDRAM), and memory bus dynamic RAM (RDRAM), etc.

The technical features of the above-mentioned embodiments can be combined arbitrarily. In order to make the description concise, all possible combinations of the various technical features in the above-mentioned embodiments are not described herein. However, as long as there is no contradiction in the combination of these technical features, all should be considered as the scope of the present disclosure.

The above-mentioned embodiments are merely some exemplary embodiments of the present disclosure, and their descriptions are more specific and detailed, but they should not be understood as a limitation on the scope of the present disclosure. It should be pointed out that those of ordinary skill in the art can make several modifications and improvements without departing from the concept of the disclosure, and these all fall within the protection scope of the present disclosure. Therefore, the scope of protection of the present disclosure shall be subject to the appended claims.

What is claimed is:

1. A method for collecting scene reconstruction data, comprising:
   capturing a scene image;
   performing real-time environment perception on the scene image to detect object to be reconstructed in the scene image and reconstructing three-dimensional representation data of the object to be reconstructed;
   determining a reconstruction target in the object to be reconstructed based on the three-dimensional representation data of the object to be reconstructed and a preset distance threshold;
   generating an exploration path according to a preset exploration path planning algorithm and exploring an area to be reconstructed according to the exploration path; and
   collecting reconstruction data of the reconstruction target according to the preset exploration path planning algorithm when the reconstruction target is reached, comprising
      generating a curved path surrounding the reconstruction target according to the three-dimensional representation data of the object to be reconstructed and the preset reconstruction path parameters when the reconstruction target is reached;
      executing a pre-defined deformation operation on the curved path to obtain a corresponding reconstruction path; and
      collecting the reconstruction data of the reconstruction target according to the reconstruction path.

2. The method according to claim 1, wherein the performing real-time environment perception on the scene image to detect the object to be reconstructed in the scene image and reconstructing three-dimensional representation data of the object to be reconstructed comprises:
   performing target detection on the scene image and generating two-dimensional representation data corresponding to the detected object to be reconstructed; and
   mapping the two-dimensional representation data to a preset three-dimensional coordinate system to obtain the three-dimensional representation data of the object to be reconstructed.

3. The method according to claim 2, wherein the mapping the two-dimensional representation data to the preset three-dimensional coordinate system to obtain the three-dimensional representation data of the object to be reconstructed comprises:
   extracting feature points from the scene image;
   performing image feature matching according to the distance between the feature point of a current frame and the feature point of a previous frame to obtain an image feature matching pair;
   analyzing depth information of the feature points and projecting the two-dimensional representation data to a preset three-dimensional coordinate system to obtain initial three-dimensional representation data; and
   updating the initial three-dimensional representation data to obtain the three-dimensional representation data of the object to be reconstructed according to the image feature matching pair.

4. The method according to claim 1, wherein the generating the exploration path according to the preset exploration path planning algorithm and exploring the area to be reconstructed according to the exploration path comprises:
   decomposing the area to be reconstructed into a plurality of non-overlapping sub-areas; and
   exploring the plurality of sub-areas according to full coverage path planning algorithm starting from a preset starting point until full coverage exploration of the area to be reconstructed is completed.

5. The method according to claim 4, the exploring the plurality of sub-areas according to full coverage path planning algorithm starting from the preset starting point until full coverage exploration of the area to be reconstructed is completed comprises:
   interrupting the exploration and collecting reconstruction data of a new object to be reconstructed according to the preset exploration path planning algorithm when the new object to be reconstructed is found and reached in the area to be reconstructed; and
   returning to the step of exploring the plurality of sub-areas according to the full coverage path planning algorithm until full coverage exploration of the area to be reconstructed is completed.

6. The method according to claim 1, after the collecting the reconstruction data of the reconstruction target according to the preset exploration path planning algorithm when the reconstruction target is reached, the method further comprising:
   determining an object to be reconstructed with the closest distance to the reconstruction target as a next reconstruction target based on the three-dimensional representation data of the object to be reconstructed and the preset distance threshold; and
   returning to the step of generating the exploration path according to the preset exploration path planning algorithm and exploring the area to be reconstructed according to the exploration path until the collection of reconstruction data of the objects to be reconstructed is completed.

7. A computer device, comprising a processor and a memory storing a computer program, wherein the processor, when executing the computer program, implements the steps of the method of claim 1.

8. A non-transitory computer-readable storage medium on which a computer program is stored, the computer program is executed by a processor to implement the steps of the method of claim 1.

9. A method for collecting scene reconstruction data; comprising:
   capturing a scene image;
   performing real-time environment perception on the scene image to detect object to be reconstructed in the scene image and reconstructing three-dimensional representation data of the object to be reconstructed;
   determining a reconstruction target in the object to be reconstructed based on the three-dimensional representation data of the object to be reconstructed and a preset distance threshold;
   generating an exploration path according to a preset exploration path planning algorithm and exploring an area to be reconstructed according to the exploration path; and
   collecting reconstruction data of the reconstruction target according to the preset exploration path planning algorithm when the reconstruction target is reached; comprising:
      generating a single reconstruction path surrounding the reconstruction target according to the three-dimensional representation data of the object to be reconstructed and preset reconstruction path parameters when the reconstruction target is reached, and collecting the reconstruction data of the reconstruction target according to the reconstruction path.

10. The method according to claim 9, wherein the performing real-time environment perception on the scene image to detect the object to be reconstructed in the scene image and reconstructing three-dimensional representation data of the object to be reconstructed comprises:
performing target detection on the scene image and generating two-dimensional representation data corresponding to the detected object to be reconstructed; and
mapping the two-dimensional representation data to a preset three-dimensional coordinate system to obtain the three-dimensional representation data of the object to be reconstructed.

11. The method according to claim 10, wherein the mapping the two-dimensional representation data to the preset three-dimensional coordinate system to obtain the three-dimensional representation data of the object to be reconstructed comprises:
extracting feature points from the scene image;
performing image feature matching according to the distance between the feature point of a current frame and the feature point of a previous frame to obtain an image feature matching pair;
analyzing depth information of the feature points and projecting the two-dimensional representation data to a preset three-dimensional coordinate system to obtain initial three-dimensional representation data; and
updating the initial three-dimensional representation data to obtain the three-dimensional representation data of the object to be reconstructed according to the image feature matching pair.

12. The method according to claim 9, wherein the generating the exploration path according to the preset exploration path planning algorithm and exploring the area to be reconstructed according to the exploration path comprises:
decomposing the area to be reconstructed into a plurality of non-overlapping sub-areas; and
exploring the plurality of sub-areas according to full coverage path planning algorithm starting from a preset starting point until full coverage exploration of the area to be reconstructed is completed.

13. The method according to claim 12, the exploring the plurality of sub-areas according to full coverage path planning algorithm starting from the preset starting point until full coverage exploration of the area to be reconstructed is completed comprises:
interrupting the exploration and collecting reconstruction data of a new object to be reconstructed according to the preset exploration path planning algorithm when the new object to be reconstructed is found and reached in the area to be reconstructed; and
returning to the step of exploring the plurality of sub-areas according to the full coverage path planning algorithm until full coverage exploration of the area to be reconstructed is completed.

14. The method according to claim 9, after the collecting the reconstruction data of the reconstruction target according to the preset exploration path planning algorithm when the reconstruction target is reached; the method further comprising:
determining an object to be reconstructed with the closest distance to the reconstruction target as a next reconstruction target based on the three-dimensional representation data of the object to be reconstructed and the preset distance threshold; and
returning to the step of generating the exploration path according to the preset exploration path planning algorithm and exploring the area to be reconstructed according to the exploration path until the collection of reconstruction data of the objects to be reconstructed is completed.

15. A computer device, comprising a processor and a memory storing a computer program, wherein the processor, when executing the computer program, implements the steps of the method of claim 9.

16. A non-transitory computer-readable storage medium on which a computer program is stored, the computer program is executed by a processor to implement the steps of the method of claim 9.

* * * * *